United States Patent [19]

Burd

[11] Patent Number: 4,978,036

[45] Date of Patent: Dec. 18, 1990

[54] DISPENSING VALVE

[75] Inventor: Wayne D. Burd, High Ridge, Mo.

[73] Assignee: Koller Enterprises, Inc., Fenton, Mo.

[21] Appl. No.: 271,519

[22] Filed: Nov. 15, 1988

[51] Int. Cl.⁵ .................... B65D 37/00; B65D 5/42
[52] U.S. Cl. ................................. 222/207; 222/181; 222/494
[58] Field of Search ........ 222/206, 207, 181, 494–496, 222/383

[56] References Cited

U.S. PATENT DOCUMENTS

| 847,722 | 3/1907 | Bender | 222/180 |
|---|---|---|---|
| 920,931 | 5/1909 | Donnelly | 222/383 |
| 1,164,754 | 12/1915 | Rose | 222/383 |
| 1,174,674 | 3/1916 | Byer | 222/383 |
| 1,187,474 | 6/1916 | Hollingsworth | 222/383 |
| 1,392,601 | 10/1921 | Rose | 222/214 |
| 1,844,557 | 2/1932 | Bobrick | 222/383 |
| 2,233,818 | 3/1941 | Matter | 222/207 |
| 2,283,529 | 5/1942 | Bobrick | 222/383 |
| 2,554,570 | 5/1951 | Harvey | 222/207 |
| 2,772,817 | 12/1956 | Jauch | 222/207 |
| 2,814,419 | 11/1957 | Lipman | 222/207 |
| 3,142,415 | 7/1964 | Louchheim | 222/383 |
| 3,828,985 | 8/1974 | Schindler | 222/207 |
| 4,085,867 | 4/1978 | Heller | 222/181 |
| 4,133,457 | 1/1979 | Klassen | 222/212 |
| 4,155,487 | 5/1979 | Blake | 222/207 |
| 4,168,020 | 9/1979 | Benson | 222/207 |
| 4,222,501 | 9/1980 | Hammett et al. | 222/207 |
| 4,315,582 | 2/1982 | Micalleff | 222/148 |
| 4,515,294 | 5/1985 | Udall | 222/105 |
| 4,646,945 | 3/1987 | Steiner et al. | 222/207 |

FOREIGN PATENT DOCUMENTS 2727679 11/1978 Fed. Rep. of Germany ...... 222/181

Primary Examiner—Michael S. Huppert
Attorney, Agent, or Firm—Edward H. Renner

[57] ABSTRACT

A dispensing mechanism for a container of liquid has a chamber formed by a flexible wall which compresses and expands in response to movement of a discharge nozzle assembly. A first fluid passage communicates between the container and the chamber and a second fluid passage communicates between the chamber and the discharge nozzle outlet. Check valves are used to control flow of liquid from the container to the chamber and the chamber to the outlet so a predetermined amount of liquid is discharged.

8 Claims, 2 Drawing Sheets

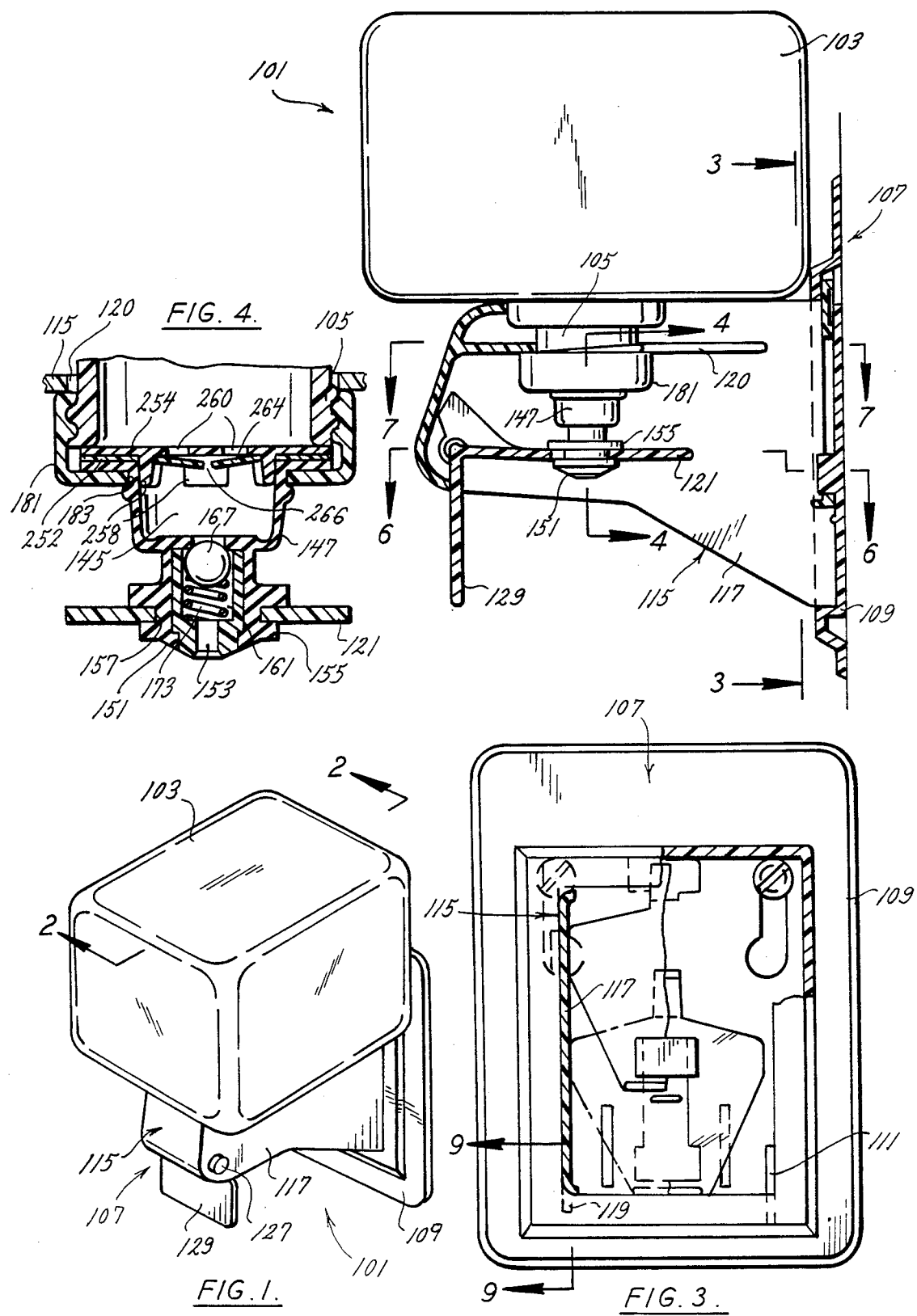

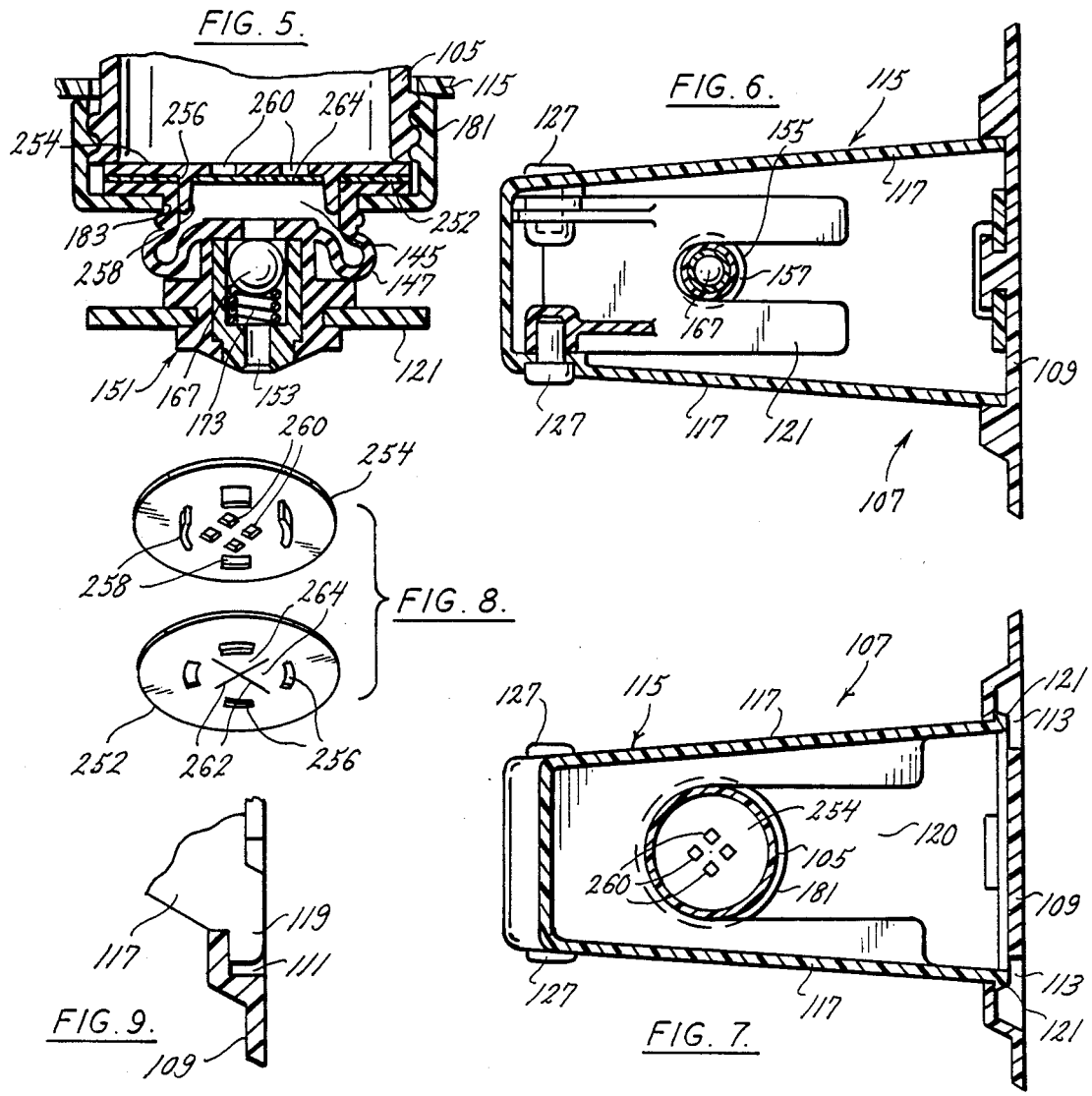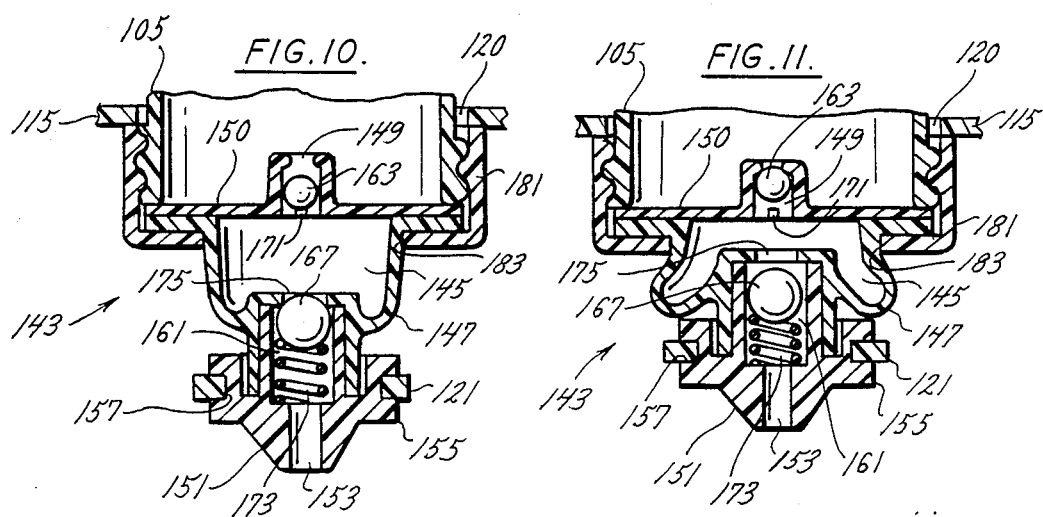

DISPENSING VALVE

BACKGROUND AND SUMMARY OF THE INVENTION

This invention relates to dispensers of the type suitable for dispensing controlled amounts of viscous and semi-viscous materials, such as soaps, hand cleaners and lotions. But, may also be used to dispense other viscous and semi-viscous materials, such as condiments including mustard and catsup. Applicant is aware of the following U.S. patents the disclosures of which are incorporated by reference herein: U.S. Pat. Nos. 847,722; 920,931; 1,164,754; 1,174,674; 1,187,474; 1,392,601; 1,844,557; 2,233,818; 2,283,529; 2,554,570; 2,772,817; 2,814,419; 3,142,415; 3,828,985; 4,085,867; 4,155,587; 4,168,022; 4,222,501; 4,315,582 and 4,515,294

Controlled portion dispensers such as dispensers for soaps, lotions and hand cleaners and other viscous and semi-viscous materials are found in many places. Commonly, they are found in washrooms and repair shops, for dispensing hand soaps and hand cleaners. Typically these devices are wall mounted and may be operated by a lever or a piston to dispense the controlled amount of material. Numerous dispensing mechanisms have been employed to facilitate the dispensing of soaps and similar material, but typical prior devices have the drawback that they are either very expensive or that the reliability suffers in long operation.

It is important that such dispensing continue to operate reliably with long use. Many dispensers fail in use by clogging or jamming in long service due to the accumulation of dry or hardened material in the device or by damage as a result of corrosion or abuse. As a result many of these devices may require repair or replacement which increases the expense of using the particular system. Applicants' have produced a dispensing system for viscous and semi-viscous materials which is highly reliable in long service and in addition is sufficiently inexpensive that it may be discarded and replaced so inexpensively that there is little cost or inconvenience in replacing the mechanism even when failure does occur. Applicants' device may be so inexpensive that it is substantially disposable, for example, with each container of liquid.

Applicants' have obtained this result by producing a small, inexpensive dispensing pump mechanism which fits into the body of a standard screw cap for a soap container or container for other liquid materials. These screw cap bodies typically have a diameter from about 1½ to 2½ inches. This presents a serious design obstacle, since the space in which applicants' device can be incorporated, using this design constraint, is quite small. The portion of material dispensed is limited by the volume of the dispensing pump. Applicants have been able to utilize this very small space by producing a pump mechanism which has the internal volume free of obstruction by the mechanism of the pump. Essentially all of the internal volume of the pump mechanism can be used to contain and dispense the viscous material. Applicant achieves this capacity by a uniquely designed mechanism which positions the pump operating mechanism, such as valves, outside of the dispensing and pumping chamber, as is more fully described herein.

Consequently, it is an object of the present invention to provide a dispensing mechanism which dispenses a pre-determined amount of viscous or semi-viscous material upon each activation.

It is a further object of the invention to provide a dispensing mechanism which is easy to use, low in cost and can be readily replaced or retrofitted to existing dispensers.

It is an object of applicants' invention to provide a dispensing mechanism which is unobstructed by the operating parts of the device.

It is an object of applicants' invention to provide an inexpensive, reliable and readily replaceable dispensing mechanism.

It is an object of applicants' invention to provide an inexpensive dispensing pump mechanism which fits within a standard screw cap body.

It is a further object of applicants' invention to provide a dispensing pump mechanism which resists jamming, clogging or failure of continued service.

It is an object of applicants' invention to provide a dispensing pump mechanism which works to dispense measured quantities of a wide variety of viscous and semi-viscous liquids.

Other objects and features of applicants' device will be apparent from the following Description of the Drawings and Description of the Preferred Embodiments.

BRIEF DESCRIPTION OF THE DRAWINGS

FIG. 1 is a perspective view of a soap or lotion dispenser with the dispensing mechanism of the present invention;

FIG. 2 is a side elevational view, partly in section, of the dispenser;

FIG. 3 is a partial sectional view taken along line 3—3 in FIG. 2;

FIG. 4 is a sectional view taken along line 4—4 in FIG. 2 showing one embodiment of applicants' invention; and FIG. 5 is a separate view of FIG. 4 showing the bellows collapsed;

FIG. 6 is a sectional view taken along line 6—6 in FIG. 2;

FIG. 7 is a sectional view taken along line 7—7 in FIG. 2;

FIG. 8 is a partial exploded view of the embodiment shown in FIGS. 4 and 5;

FIG. 9 is a partial and sectional view taken along line 9—9 in FIG. 3;

FIG. 10 is a sectional view showing a further embodiment of applicants' invention, and FIG. 11 is a separate view of FIG. 10 showing the bellows collapsed.

Corresponding reference characters illustrate corresponding parts throughout the several views of the drawings.

DESCRIPTION OF THE PREFERRED EMBODIMENTS

Referring to the drawings, a dispenser for dispensing a soap or a lotion is indicated generally 101. The dispenser 101 utilizes a container 103 of generally rectangular prismatic shape which has a threaded opening 105 in the bottom of the container, as shown. The container 103 may be fitted with a bracket assembly 107 which includes a wall mounted plate 109. The plate 109 has bottom slots 111, and top slots 113, as shown in FIGS. 2, 3, 6 and 7. Container 103 fits in a U-shaped holder 115 which has side arms 117. Arms 117 have lugs 119 and 121 that are received in the slots 111 and 113, as shown, and mount the container 103 to the bracket assembly 107. The base of the holder 115 has an opening 120 through which the threaded opening 105 extends, as shown.

A U-shaped plate 121 extends outwardly from the lower portion of holder 115, as shown. Pivot pins 127 extend between holder 115, and plate 121, as shown. Lever arm 129 extends from plate 121, as shown.

As shown in FIGS. 10 and 11, a dispensing mechanism for dispenser 101 is indicated generally 143 and comprises a chamber 145 formed by a substantially cylindrical wall 147. It will be appreciated that wall 147 may have a different cross-section, if desired. Wall 147 is compressible, as shown in FIG. 11; and expandable, as shown in FIG. 10. Wall 147 may be formed of standard elastomers, such as, but not limited to rubber, vinyl, or other conventional elastomers, by conventional processes, such as molding. A first fluid passage 149 communicates between opening 105 in container 103 and chamber 145. Fluid passage 149 communicates through a substantially rigid plate 150. Plate 150 defines the upper limit of chamber 145 and with cylindrical wall 147 forms the enclosing structure of chamber 145.

The dispensing mechanism also includes a discharge nozzle or nozzle assembly 151 which has an outlet 153. The nozzle assembly has an upper cylindical portion 155 in which a circumferential groove 157 is formed. U-shaped plate 121 fits in groove 157. The lower portion of the nozzle assembly 151 is frusto-conical in shape. A second fluid passage 161 communicates between chamber 145 and outlet 153.

A first check valve means 163 is positioned in passage 149. Similarly, a second check valve means 167 is positioned in passage 161. The first valve means includes a stop 171 formed at the lower end of chamber 149; while the second valve 167 means includes a bias spring 173 seated at the lower end of passage 161 and urging the check valve 167 against the restricted opening 175 at the upper end of the passage. As can be seen in FIGS. 10 and 11, the valve means 163 and the valve means 167 are each placed at a location remote from chamber 145. Valve means 163 is located outside of chamber 145 on the outer side of planar member 150. Valve means 167 is located below chamber 145 in the nozzle 151. This mechanism leaves the volume of chamber 145 completely unobstructed and permits substantially the entire volume to be used to dispense material when compressed, as shown in FIG. 11. Since substantially all of chamber 145 may be used for dispensing, the mechanism can be made quite compact, reducing the cost of materials considerably. As a result, the structure can be made to fit in a standard screw cap body 181, such as shown in FIGS. 10 and 11. It being understood that cap body 181 is provided with a suitable aperture 183.

In operation, as shown in FIGS. 2 and 11, discharge nozzle assembly 151 is pressed upwardly by counterclockwise movement of lever arm 129 and U-shaped plate 121. This movement compresses chamber wall 147, as shown in FIG. 11, and the resultant pressure created in chamber 145 seats check valve 163 against the upper end of passage 149, closing the passage 149, and unseats check valve 167, opening passage 161. The soap or lotion contained in chamber 145 is then discharged through passage 161 to outlet 153.

When the lever 129 is released, the chamber wall 147 expands back to its original position shown in FIG. 10. At this time, spring 173 moves check valve 167 to a position blocking passage 161. Simultaneously, the pressure or suction on check valve 163 pulls it downward against stop 171, opening the passage 149 between the container 103 and the chamber 145. Soap or lotion then flows through the passage 149 and fills chamber 145.

With each cycle, the chamber 145 is filled with a predetermined amount of soap or lotion and this amount does not vary as the container 103 is gradually drained. Consequently, users of the dispenser 101 can rely on an adequate amount of soap or lotion being dispensed regardless of the amount still remaining in the container 103. It should also be noted that the dispensing mechanism 101 can readily be retrofitted to existing dispensers and is easily installed for use therewith.

A further embodiment of applicants' invention is shown in FIGS. 4, 5 and 8. This embodiment may be similar in most respects to that described above, with the exception that plate 150 is substituted by a pair of cooperating plates 252 and 254. Lowermost plate 252 includes a set of apertures 256 therethrough, as shown, and plate 254 has a set of projections 258, as shown in FIG. 8. As shown in FIGS. 4 and 5, projections 258 are received through apertures 256 to position plate 254 in cooperation with plate 252. Plate 254 also has a set of apertures 260 extending therethrough, as shown. Plate 252 has a plurality of cuts 262 extending therethrough, as shown in FIG. 8. Cuts 262 are shown as being in a crossed shape, but it will be appreciated that other shapes or arrangements may be used. Cuts 262 produce a set of resilient flaps 264 in plate 252. It will be appreciated that plate 252 will normally be made of a resilient material, such as conventional semi-rigid plastic materials, for example, polyethylene, PVC and the like, so that segmental flaps 264 are sufficiently resilient to provide a resiliently closable and openable passageway 266, as will be described further herein.

In operation, in the manner previously described, when chamber 145 is compressed, as shown in FIG. 5, resilient segments 264 are pressed upwardly against substantially rigid plate 254 to provide a substantially fluid tight closure of passages 260. In this configuration, the material in chamber 245 is dispensed through passage 153 as described for the prior embodiment. When the pressure or upward force on nozzle assembly 151 is released, the resilient wall 147 resumes the configuration shown in FIG. 4, closing passageway 161 as previously described. In the process of resuming the configuration shown in FIG. 4, a partial vacumn is created in chamber 145 flexing segments 264 to the configuration shown in FIG. 4 and opening the passage 266 so that a clear pathway is formed from the interior of container 103 through threaded opening 105 and passageways 260 into chamber 145. Chamber 145 is then filled with material, as previously described herein.

It will be appreciated that modifications of the structure disclosed herein for purposes of illustration may be readily made by those skilled in the art without departing from the spirit of the invention. Applicants' invention is not to be limited by the specifics of the embodiments disclosed, but only by the claims appended hereto and their equivalents.

We claim:

1. A dispensing mechanism for a container of liquid, the container having an opening in one side thereof, the mechanism comprising:
   (a) a chamber formed in part by a flexible wall which is compressible and expandable;
   (b) a planar member forming a part of the chamber;

(c) a first fluid passage for communicating between an opening in a container and the chamber through the planar member;
(d) a discharge nozzle;
(e) a second fluid passage communicating between the chamber and the nozzle; and
(f) means for compressing the wall of the chamber;
(g) first ball check valve means positioned in the first fluid passage and a second valve means positioned in the second fluid passage at a location remote from the chamber whereby liquid in the chamber is discharged through the nozzle when the wall of the chamber is compressed and liquid in the container is drawn into the chamber when the compression is released and the chamber expands, the first and second valve means including means for acting without obstructing the interior of the chamber, the first valve means being closed when the chamber is compressed and opening when the compression is released, permitting a predetermined amount of liquid to be drawn from the container into the chamber, via the first fluid passage, when the first valve means is open.

2. The mechanism of claim 1 wherein the valve has a lever and the nozzle has a groove in which an arm of the lever fits for the lever to press the nozzle and compress the chamber.

3. The mechanism of claim 1 wherein the check valve is positioned on the planar member at a location remote from the chamber, the planar member being substantially rigid.

4. A dispensing pump for a viscous fluid comprising:
(a) a chamber formed in part by a flexible wall;
(b) the chamber having an upper member forming a part of the chamber;
(c) means for defining a first fluid passage to the chamber through the upper member;
(d) the pump having a discharge nozzle;
(e) the discharge nozzle having means for defining a second fluid passage between the chamber and the discharge nozzle;
(f) a first ball check valve means positioned in the first fluid passage means and second valve means positioned in the second fluid passage means, the first and second valve means including non-restricting means for communicating with the chamber through the first and second fluid passage means, and
(g) the pump having means for discharging fluid in the chamber through the nozzle when the nozzle is pressed to collapse the chamber and having means for drawing fluid into the chamber when the nozzle is released, including the first and second valve means, the first and second valve means including means for acting without substantially obstructing the interior of the chamber, the first valve means being closed when the nozzle is pressed and opening when the nozzle is released, a predetermined amount of fluid being drawn from the container into the chamber, via the first fluid passage, when the first valve means is open.

5. The mechanism of claim 4 wherein the pump has an associated lever and the nozzle has a groove in which an arm of the lever fits for the lever to press the nozzle.

6. The mechanism of claim 4 wherein the first valve means is positioned on the upper member at a location remote from the chamber.

7. A dispensing pump for a viscous fluid comprising:
(a) a chamber formed in part by a flexible wall;
(b) the chamber having an upper member forming a part of the chamber;
(c) means for defining a first fluid passage to the chamber through the upper member;
(d) the pump having a discharge nozzle;
(e) the discharge nozzle having means for defining a second fluid passage between the chamber and the discharge nozzle;
(f) a first segmented diaphragm valve means positioned in the first fluid passage means and second valve means positioned in the second fluid passage means, the first and second valve means including non-restricting means for communicating with the chamber through the first and second fluid passage means, the diaphragm valve means including a plurality of plates, one of said plates including means for relatively positioning the plates, and
(g) the pump having means for discharging fluid in the chamber through the nozzle when the nozzle is pressed to collapse the chamber and having means for drawing fluid into the chamber when the nozzle is released, including the first and second valve means, the first and second valve means including means for acting without substantially obstructing the interior of the chamber.

8. The mechanism of claim 7 wherein the positioning means including depending projections on an upper plate and means for receiving the projections on a lower plate.

* * * * *